No. 833,966. PATENTED OCT. 23, 1906.
F. J. JOHNSTON.
DECOY.
APPLICATION FILED MAY 7, 1906.
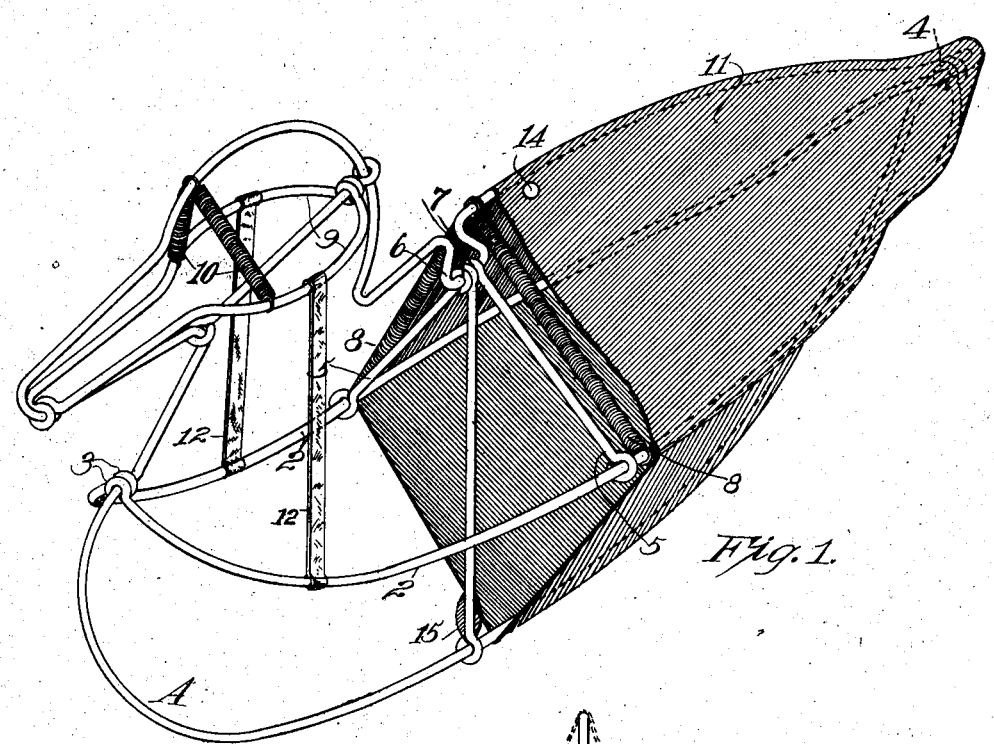
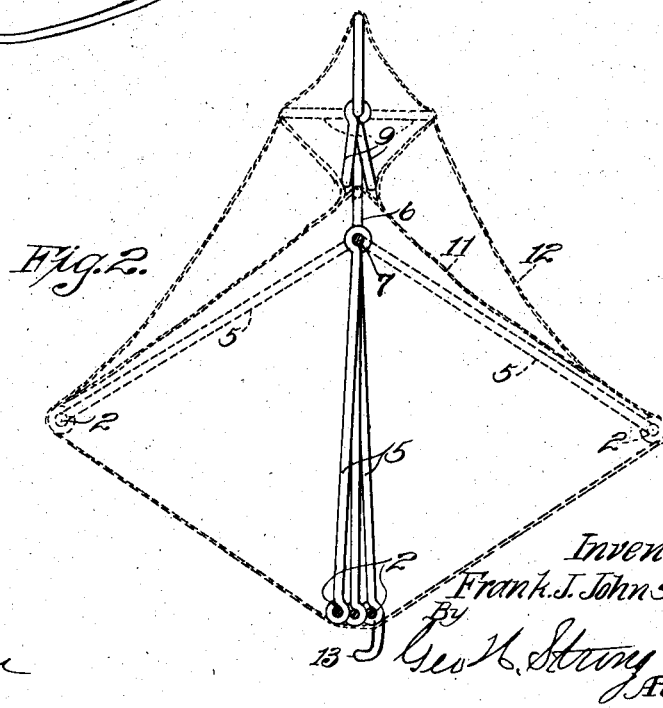
Witnesses:
F. E. Maynard.
Inventor,
Frank J. Johnston;
By
Geo. H. Strong
Atty

UNITED STATES PATENT OFFICE.

FRANK J. JOHNSTON, OF SACRAMENTO, CALIFORNIA.

DECOY.

No. 833,966.　　　　Specification of Letters Patent.　　　　Patented Oct. 23, 1906.

Application filed May 7, 1906. Serial No. 315,556.

*To all whom it may concern:*

Be it known that I, FRANK J. JOHNSTON, a citizen of the United States, residing at Sacramento, in the county of Sacramento and State of California, have invented new and useful Improvements in Decoys, of which the following is a specification.

My invention relates to decoys or lures in the image of a duck or other bird or fowl. Its object is to provide a light, cheap, simple, practical, foldable or collapsible decoy which shall be self inflatable or distendible.

The invention consists of the parts and the construction and the combination of parts as hereinafter more fully described and claimed, having reference to the accompanying drawings, in which—

Figure 1 is a perspective view of my decoy with part of the canvas covering broken away to show the internal mechanism. Fig. 2 is a front view of the decoy, the dotted lines showing the decoy distended and the full lines showing it collapsed.

A represents the body-frame or profile-frame, which is preferably of wire, or it may be of bamboo or other suitable bendable material bent into the side outline or profile of a bird to be simulated. This profile is complete and includes the head and body and corresponds to a vertical longitudinal central section through the bird.

2 represents two foldable side frames, one on each side of the profile-frame A and pivoted at front and rear of the profile-frame, as shown at 3 4, and adapted when extended outward in normal position to simulate the outline of a bird as viewed from above and when resting on the water. The side frames are connected intermediate of their ends to the top back portion of the profile-frame and braced by means of the radius rods or wires 5.

The top of the profile-frame is dropped or made with a suitable reëntrant portion 6, so that the pivots 3 4 of the side frames and the pivots 7 of the radius-wires 5 may be brought substantially in the same axial line. The side frames are connected to the back portion by the spring 8, and the tendency of these springs is always to draw the side frames upward and outward away from the bottom or keel portion of the profile-frame, so that when the proper covering is stretched over the profile and side frames and secured in the proper manner and the upward and outward movements of the side frames properly limited the device will tend always to automatically assume the outline of a duck when viewed either from the top, side, or front.

The head portion of the profile-frame is also provided with two spring-actuated side frames 9, which operate in a similar manner and for a similar purpose as the side frames 2, the springs 10, which have one end secured to the profile-frame and the other to the side frames 9, normally acting to spread the side frames out in the proper manner.

The profile-frame and the various side frames are suitably covered with any appropriate flexible waterproof fabric 11, and the same is so secured to the frame that proper allowance is made for slack to accommodate the fabric to the various pivotal movements of the several side frames.

The distendible or expansible movements of the side frames relative to the profile-frame are preferably limited by securing the fabric to the side frames, so that the fabric forming the under side of the duck will be stretched tight over the bottom or keel portion of the profile-frame when the decoy is expanded in normal working position. The fabric is suitably brought in at the sides between the head and body portions to give proper contour to the neck of the duck.

It is desired that the body side frames 2 and the head side frames 9 may be operated in unison by a single movement or action on the part of the operator, so as to render the handling of the decoy simpler. Therefore some suitable connections are made between the frames 9 2, so that when the frames 2 are folded downward into the full-line position (indicated in Fig. 2,) the side head-frames 9 will be similarly folded, so that the decoy will assume a flat collapsed condition ready for packing. I have shown the side frames 2 and 9 connected by the tapes 12, which serve the purpose of drawing down the head side frames simultaneously with the bringing together of the side body-frames 2. The decoy may be held in this flattened collapsed condition against the tension of the springs 8 10 by any suitable means, such as the hook member 13, carried by one of the side body-frames and adapted to engage over the other side body-frame.

When the fabric is stretched over the frames and properly secured thereto, it incloses a water-tight compartment entirely closed except for a small air-vent 14, suitably disposed above the water-line. This vent 14 is for the purpose of allowing the inhaust and exhaust of the air from the compartment, according as the decoy is distended for use or folded up.

It is thus seen that I produce a decoy which is very light, durable, capable of being folded into a very compact package, and which, moreover, is instantaneously and automatically inflated or distended ready for use as soon as the means are released which hold the side frames together.

In order to maintain the decoy upright in the water, suitable ballast is employed at a suitable point below the water-line. I have shown a weight 15 fastened to the brace-wire which runs from the back to the keel and inside the covering.

Having thus described my invention, what I claim, and desire to secure by Letters Patent, is—

1. A decoy comprising a profile-frame, side frames hinged thereto, a suitable covering for said profile and side frames, and means for automatically distending said side frames into operative position.

2. A decoy comprising a collapsible articulated framework, a suitable covering for said framework, means for holding said framework in collapsed condition, and means for automatically distending said framework-covering into operative position on the release of said holding means.

3. A decoy comprising a collapsible framework and a suitable covering, and means for automatically distending the decoy 4. A decoy comprising a profile-frame normally distended spring-actuated side frames, and a suitable covering for said profile and side frames.

5. A decoy comprising the combination of a profile-frame, spring-actuated side body-frames hinged to said profile-frame, suitable covering for said profile and side body-frames, said side body-frames being normally distended and foldable into planes substantially parallel with the plane of the profile-frame.

6. A decoy comprising a profile-frame, normally distended spring-actuated side body-frames, normally distended spring-actuated side head-frames, and a suitable covering for said several frames.

7. A decoy comprising a profile-frame, normally distended spring-actuated side body-frames, normally distended spring-actuated side head-frames, a suitable covering for said several frames, and means for placing the side body-frames and the side head-frames simultaneously into planes substantially parallel with the profile-frame.

In testimony whereof I have hereunto set my hand in presence of two subscribing witnesses.

FRANK J. JOHNSTON.

Witnesses:
L. S. UPSON,
MABEL C. DAVIS.